(12) United States Patent
Strack et al.

(10) Patent No.: US 8,224,997 B2
(45) Date of Patent: Jul. 17, 2012

(54) DOCUMENT SOURCE DEBUGGER

(75) Inventors: Michael Anthony Strack, Round Rock, TX (US); Allen Keith Wilson, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/391,013

(22) Filed: Feb. 23, 2009

(65) Prior Publication Data

US 2010/0217891 A1  Aug. 26, 2010

(51) Int. Cl.
G06F 15/16 (2006.01)
G06F 9/44 (2006.01)
(52) U.S. Cl. ......... 709/246; 709/203; 717/112; 717/124
(58) Field of Classification Search .................. 717/112, 717/124; 709/246
See application file for complete search history.

(56) References Cited

U.S. PATENT DOCUMENTS

| | | | |
|---|---|---|---|
| 6,668,369 B1 * | 12/2003 | Krebs et al. ................... | 717/125 |
| 6,993,753 B2 | 1/2006 | Yamanaka et al. | |
| 7,185,319 B2 * | 2/2007 | Kaler et al. .................... | 717/124 |
| 7,395,419 B1 | 7/2008 | Gonion | |
| 2002/0100016 A1 * | 7/2002 | Van De Vanter et al. ..... | 717/112 |
| 2003/0041180 A1 * | 2/2003 | Schlussman ................. | 709/328 |
| 2003/0079159 A1 | 4/2003 | Ten-Hove et al. | |
| 2005/0004973 A1 | 1/2005 | Snover et al. | |
| 2006/0048120 A1 | 3/2006 | Archambault et al. | |
| 2007/0157183 A1 | 7/2007 | Pazel et al. | |
| 2007/0168984 A1 | 7/2007 | Heishi et al. | |
| 2008/0005273 A1 | 1/2008 | Agarwalla et al. | |
| 2008/0104574 A1 | 5/2008 | Mak et al. | |
| 2008/0127100 A1 | 5/2008 | O'Farrell et al. | |
| 2008/0229076 A1 | 9/2008 | Gonion | |

OTHER PUBLICATIONS

Ciabrini et al., "Bugloo: A Source Level Debugger for Scheme Programs Compiled into JVM Bytecode", pp. 1-12, in Proceedings of the International Lisp Conference , 2003 http://www-sop.inria.fr/mimosa/fp/Bugloo/./doc/cia03.pdf.

Clarke et al., "A Compiler Project for Translating a C Subset to SPARC Assembly Language", University of Pennsylvania Department of Computer and Information Science Technical Report, No. MS-CIS-93-89,Nov. 2, 1993, pp. 1-21 http://repository.upenn.edu/cis_reports/289.

* cited by examiner

Primary Examiner — Kevin Bates
Assistant Examiner — Robert B McAdams
(74) Attorney, Agent, or Firm — Garg Law Firm, PLLC; Rakesh Garg; Libby Z. Toub (57) ABSTRACT

Embodiments of the invention are directed to a data transfer network having a server side and a client side, wherein content is sent from the server side to the client side in successive output streams to dynamically create a document on the client side, and the content for different output streams is provided, respectively from different ones of a plurality of originating sources that are located on the server side. One embodiment, directed to a method, includes the steps of intercepting a given output stream, and determining whether or not a debug directive can be inserted into the intercepted output stream, wherein the determination is made in conformance with pre-specified lexeme rules associated with the intercepted output stream. Responsive to a determination that a debug directive can be inserted into the intercepted stream, a debug directive is created that contains information identifying the originating source on the server side which provided the content for the intercepted output stream. The method further includes inserting the created debug directive into the intercepted stream at a selected insertion location.

20 Claims, 5 Drawing Sheets

304a — 1.  `<!-- IBM.DSD_start -->`

302 {
2.  `<!DOCTYPE html PUBLIC "-//W3C//DTD HTML 4.01 Transitional//EN" "http://www.w3.org/TR/html4/loose.dtd">`
3.  `<HTML LANG="eng">`
4.  `<HEAD>`
5.  `<TITLE>Hello Example</TITLE>`
6.  `</HEAD>`
7.  `<BODY>`

304b — 8.  `<!-- IBM.DSD_end: /hello.jsp:3 -->`

*FIG. 3A*

308a — 9.  `<!-- IBM.DSD_start -->`

306 { 10.  `Hello There! I am   <img src="mypicture.jpg" width="62" height="55" align="middle"/><P>`

308b — 11.  `<!-- IBM.DSD_end: /greeting.jsp:4-6 -->`

DOCUMENT SOURCE DEBUGGER

BACKGROUND OF THE INVENTION

1. Field of the Invention

The invention disclosed and claimed herein generally pertains to a method for debugging errors in a document, wherein a client side document is dynamically created from a plurality of different server side sources. More particularly, the invention pertains to a method of the above type wherein a document source debugger is used to identify the particular server side source in which the error originated. Even more particularly, the invention pertains to a method of the above type wherein the source of error can be determined on the client side.

2. Description of the Related Art

In a data transfer network such as the Internet, it has become quite common to provide client side web browsers or the like with documents that are generated dynamically by computer programs, rather than being produced from static documents. For example, HTML pages are often dynamically generated by executing server side programs or program components, such as JavaServer Pages (JSP), Servlet or Portlet. Moreover, a page can be created from multiple server side sources, such as two or more of these or other programs or program components.

When an error is discovered from client-side, such as, a web browser, in a dynamically created document of the above type, it may be necessary to determine the server side source that originally produced the error, so that the error can be fixed. As an example, this can be important for system compliance validation, in regard to issues such as system security, quality and accessibility. In such compliance validation, a validation program applies validation rules to a document, such as HTML, PDF or XML document, to identify compliance errors in the document. However, even if source of error detection is important for these issues, it can be difficult to identify, in a multi-source arrangement, the particular source that originated the error.

This identification problem is complicated even further, when the source for some of the content of the document is a server side script, such as JSP or Hypertext Preprocessor (PHP). Before being executed, a script of this type may need first to be transformed to a target source. For example, an original input source comprising JavaServer Page (JSP) script must be transformed into a target source, such as Java Servlet class before it can be executed. Complexities such as these have generally made it difficult to identify errors, even more difficult to fix them in dynamically generated pages of the above type, particularly from the client side. Such difficulties in turn interfere with system compliance validation efforts.

BRIEF SUMMARY OF THE INVENTION

Embodiments of the invention are directed to a data transfer network having a server side and a client side, wherein content is sent from the server side to the client side in successive output streams to dynamically create a document on the client side, and the content for different output streams is provided, respectively from different ones of a plurality of originating sources that are located on the server side. One embodiment, directed to a method, includes the steps of intercepting a given output stream, and determining whether or not a debug directive can be inserted into the intercepted output stream, wherein the determination is made in conformance with prespecified lexeme rules associated with the intercepted output stream. Responsive to a determination that a debug directive can be inserted into the intercepted stream, a debug directive is created that contains information identifying the originating source on the server side which provided the content for the intercepted output stream. The method further includes inserting the created debug directive into the intercepted stream at a selected insertion location.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
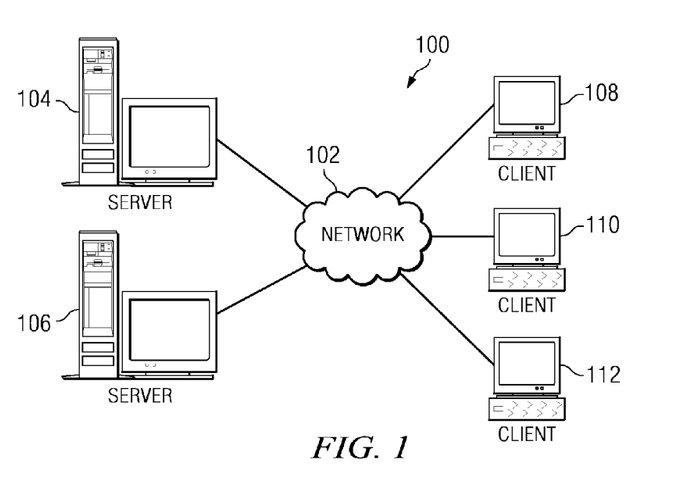
FIG. 1 is a data processing network showing server side and client side components that respectively may be used in implementing embodiments of the invention.

Referring to FIG. 1, there is shown a pictorial representation of a network 100 of computers or data processing systems, in which embodiments of the present invention may be implemented. Network processing system 100 contains a network 102, which is the medium used to provide communication links between various server side and client side devices and computers of network 100. Communication network 102 may include connections, such as wire, wireless communication links, or fiber optic cables.

In the depicted example, server 104 and server 106, as well as clients 108, 110, and 112, respectively connect to network 102. The clients comprise client browsers which may be implemented, for example, by personal computers or network computers. Servers 104 and 106 are associated with websites, or comprise other server side components that are able to furnish client browsers with dynamically created documents that include content from multiple program sources. Network data processing system 100 may include additional servers, clients, and other devices not shown.

In FIG. 1, network data processing system 100 may be the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 2:
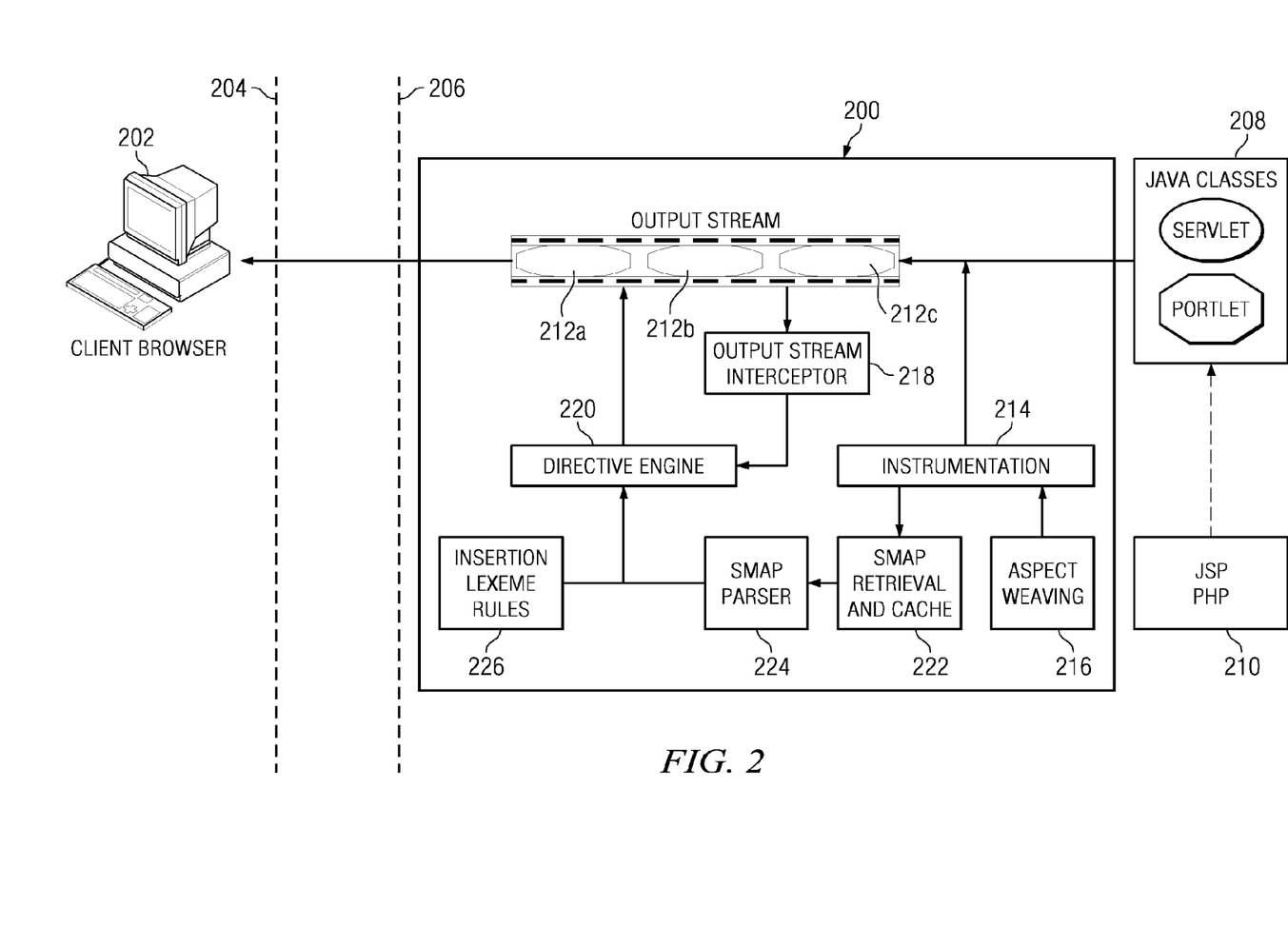
FIG. 2 is a schematic diagram illustrating components of an embodiment of the invention.

Referring to FIG. 2, there is shown a client browser 202 located on a client side 204 of a network for routing or transferring data, such as network 102 of FIG. 1. Browser 202 may, for example, be located at one of the clients 108-112. Browser 202 is disposed to receive a document (such as HTML, PDF or XML, not shown) comprising one or more pages, which is dynamically generated on a server side 206 of the network. More particularly, the document is created from multiple sources of programs or components 208 on the server side, which are exemplified in FIG. 2 by Java Servlet and Portlet.

Servlets are Java programming language classes that dynamically process requests and construct responses, for use in adding dynamic content to web servers. Portlets are software components that can be aggregated into a portal page. Of course, other sources of programs or program components may be used, in addition to or instead of those shown in FIG. 2, in order to dynamically create a document. It is to be appreciated that because multiple program sources are used to produce the document, different portions or fragments of the document, or even different portions of the same document page, can include content that has originated from different program sources which may be in turn from servers located in different geographic regions.

To further illustrate the complexity associated with use of multiple program sources to create a single document, FIG. 2 shows server side scripts 210, exemplified by JSP and PHP. Scripts of these types can also be original program sources for providing document content. However, before any such server side script (e.g., JSP) can be executed, it may need first to be transformed to a target class (e.g. Servlet). Only then can it be compiled into a target binary class, for use to generate dynamic client document, for instance, an HTML document which is used thereinafter as an example.

Referring further to FIG. 2, there are shown output streams 212a-c, which are successively created on server side 206 and routed to client browser 202. Respective output streams comprise content for dynamically constructing the HTML document at browser 202, as described above. To provide a given output stream, a program source component such as one of those described above is executed, by means of a server located on server side 206. This execution produces the content for the given output stream, wherein the content comprises a unit of content. Also, the given output stream includes an identifier or other information that explicitly identifies both the program source and the line number of such source that was directly used to generate the unit of content of the given output stream. The identifier and other information are for source debugging purpose, and creation of the source debugging information is described hereinafter in detail from blocks 214-226 of FIG. 2.

While not shown in FIG. 2, the server used to execute the source component on the server side could, as an example, be one of the servers 104 or 106 of FIG. 1.

An HTML document created from a succession of output streams as described above can contain errors. For example, the HTML document might contain confidential information that should not be exposed, or it might contain images and interactive form fields that are not accessible to visually-impaired users. It can be very challenging to determine the server side source program that originated a particular error, since the content of respective output streams may be derived from any of multiple sources. Accordingly, embodiments of the invention provide a document source debugger for use in tracing the error back to the originating program source. Referring further to FIG. 2, there is shown a configuration of components 200 which cooperatively interact with one another and with successive output streams, in order to carry out this debugger task. The source debugger can be used, for example, with a validation tool as described hereinafter in connection with FIG. 5.

Configuration 200 of FIG. 2 includes an instrumentation component 214 and a software component 216 known as Aspect Weaving. Instrumentation component 214 and Aspect component 216 together are used to intercept class loading process and programmatically manipulate class binary to provide informational callbacks, which can be used to insert debug directives into the output stream as described hereinafter. More particularly, these two elements perform two functions with respect to each output stream. The first function is to place "interception hooks" in a loaded class which generates the output stream, by manipulating the binary code of the class. This procedure is described hereinafter in further detail in connection with FIG. 3. Providing the loaded class with interception hooks causes the stream which is generated by the class to be intercepted, by an output stream interceptor 218. The intercepted stream is then made available for examination by directive engine 220, as described hereinafter.

The second function carried out by the components 214 and 216 is to acquire the information from each output stream that identifies the program source and the line number of such source that generated the output stream content. After acquisition, this information is routed from instrumentation component 214 to an SMAP retrieval and cache component 222.

As described above, if the unit of content of an output stream is originated by a script such as JSP, the script code may first be transformed to a target class source, such as Servlet. During the transformation and compilation, source map (SMAP), which contains mapping between original source (such as JSP) line number and corresponding target (such as Servlet) source line number, is preserved in a SMAP section of the target class, for example, as specified JSR-045: Debugging Support for Other Languages. When the class source is then used to generate the output stream content, the source information that is included with the content will be the target class source (e.g. Servlet) and the pertinent line number of such class source. As a result, instrumentation component 214 will acquire the class source information, rather than the true source information, for the originating script.

In view of this, SMAP component 222 is furnished with a source map (SMAP), which is retained in a cache, one SMAP for each target class (such as Servlet). The SMAP maps or references the line numbers of the originating script source (e.g. JSP) to their respective corresponding line numbers of the target class source (e.g. Servlet). Accordingly, when a SMAP exists for a given target class (e.g. Servlet), the cached SMAP is queried to retrieve the identified script source and line number; accordingly, the received source and line information are routed from SMAP component 222 to directive engine 220, through SMAP parser 224. If a SMAP does not exist for a given target class, it is concluded that the source identified by the received information is in fact the originating source for the content of the given output stream; accordingly, the received source and line information are routed from SMAP component 222 to directive engine 220, bypassing SMAP parser 224.

On the other hand, if it is discovered that the identified source and line number are contained in the cached SMAP, then the script source and line number corresponding thereto, as shown by the SMAP, are selected and sent to parser 224. Data from the SMAP has a formatting that is altered by parser 224, to place the data in a usable form by Directive Engine 220. The script source and line number information is then routed to directive engine 220.

When an output stream is intercepted as described above, directive engine 220 examines the contents thereof, and then uses insertion lexeme rules 226 to determine whether or not a debug directive should be inserted into the intercepted stream. If a debug directive is to be inserted, the directive engine 220 further determines the particular location for insertion along the output stream. The directive engine 220 also obtains the source and line numbers for the intercepted output stream from the SMAP cache 222, for use in constructing the debug directive.

Upon determining that a debug directive should not be inserted into the intercepted output stream, the directive engine decides whether or not the content of the output stream should be cached for further inspection.

The lexeme rules are provided to engine 220 from a component 226. The rules determine a minimum unit of content (or lexeme) for an output stream, below which a debug directive cannot be inserted. A lexeme rule is predetermined based on content type in the stream, therefore, a lexeme is content specific. As an example, an HTML tag body (e.g. <FONT SIZE="4"> is a lexeme. Accordingly, a debug directive cannot be inserted into the unit of content (the tag body) which is determined to be a lexeme, because a lexeme cannot be broken up.

Figure 3A:
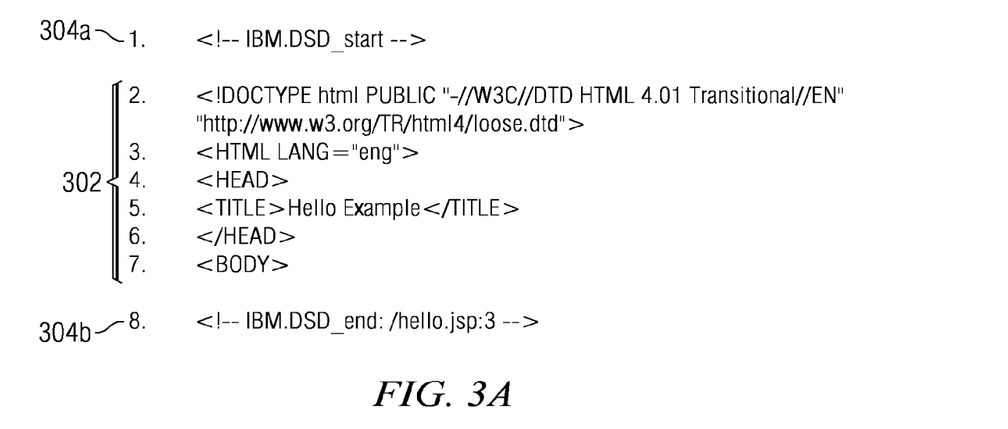
FIGS. 3A and 3B show exemplary debug directives provided by an embodiment of the invention.

Referring to FIG. 3A, there is shown an exemplary debug directive inserted into an output stream by engine 220, such as one of the streams 212a-c of FIG. 2. The content 302 of the output stream comprises lines 2.-7., which is HTML code fragment that is originated by a JSP source and is outputted to the client browser. More particularly, the HTML code fragment of 302 is generated by line 3 of the JSP source file "hello.jsp" as indicated in the end debug directive <!--IBM.DSD_end:/hello.jsp:3-->.

Each debug directive clause is a language or content-specific comment; therefore, it won't interfere with the normal processing of the generated client. For instance, if content in the current stream is identified as HTML fragment, debug directive will be inserted in the form of HTML comment; if content in the current stream is identified as Cascading Style Sheets (CSS) fragment, debug directive will be inserted in the form of CSS comment.

The debug directive of FIG. 3A comprises the clauses 304a, "IBM.DSD_start", and 304b, "IBM.DSD_end", placed at the beginning and end, respectively, of the HTML code fragment at lines 2.-7. The debug directive comprises IBM.DSD comments, and indicates that the lines of code between start clause 304a and end clause 304b are generated by the source and line number that is included in the end clause. Thus, FIG. 3A shows that the lines of code 2.-7. are generated by line 3 of "jsp.hello", as described above.

The debug directive start and end clauses start with an identifier, IBM.DSD. The identifier is used to distinguish debug directive from any other programming metadata or comments. Accordingly, if an error is detected at the browser in the content to which the debugger directive has been applied, the end clause can readily be queried, to determine the original server side source and line number that produced such content.

Figure 3B:
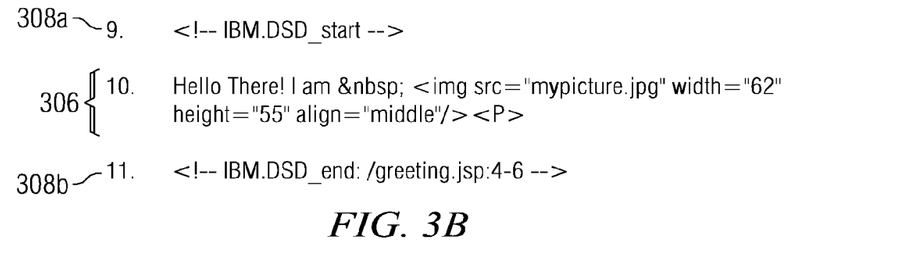

FIG. 3B shows a further example of a debug directive inserted into output stream content. The content 306 comprises line 10, and the debug directive comprises start clause 308a and end clause 308b, collectively. By recovering the end clause 308b at the client side, it can readily be determined that the line of code 10 in FIG. 3B was originated from line 4-6 of "greeting.jsp" of the JSP source.

Figure 4:
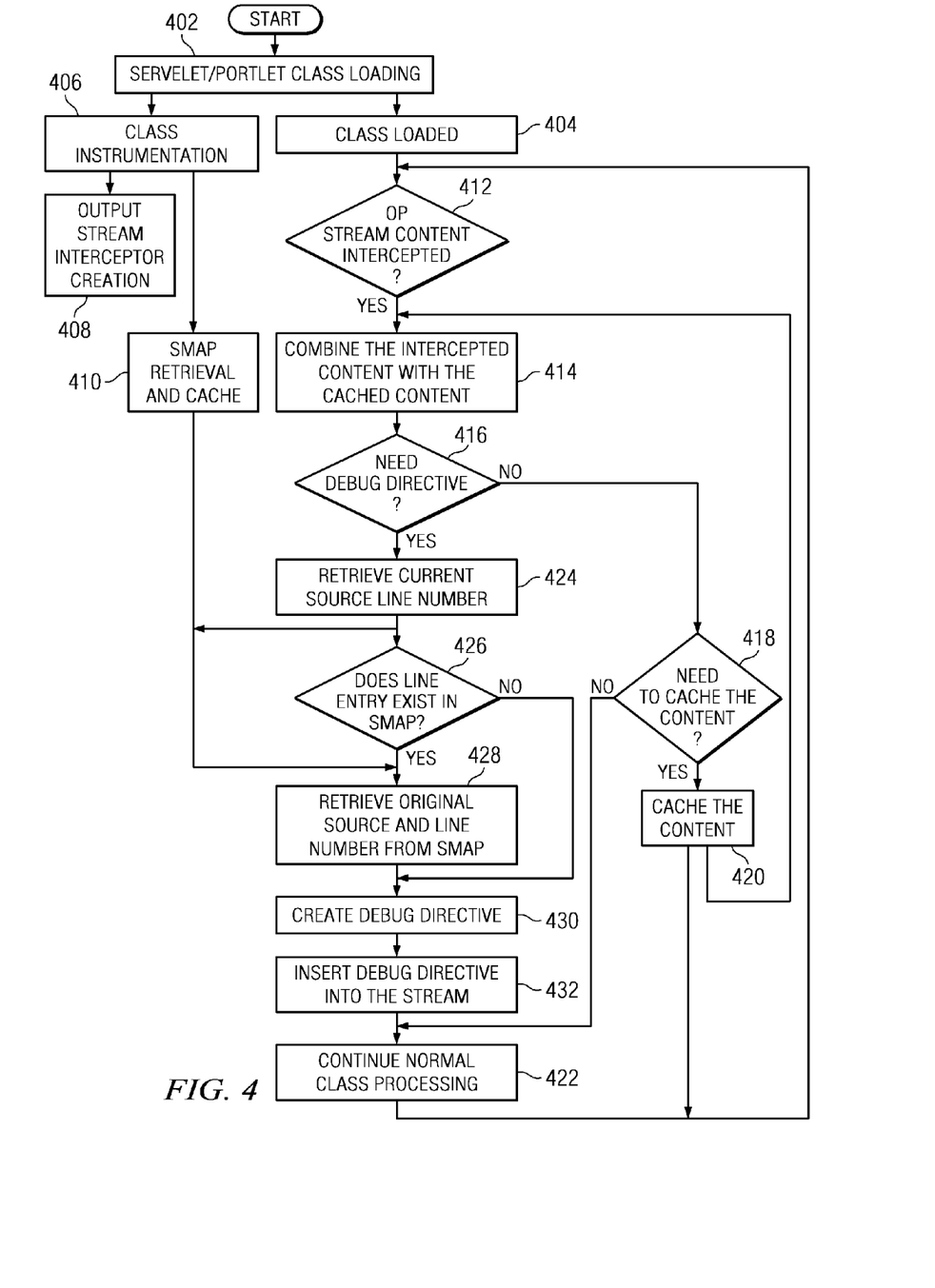
FIG. 4 is a flowchart showing steps of a method comprising an embodiment of the invention.

Referring to FIG. 4, there is shown a flowchart depicting steps of a method pertaining to operation of respective elements of configuration 200 shown in FIG. 2. When the method begins, a source such as Portlet or Servlet class is loaded into computer memory for example, as shown by steps 402 and 404, to provide an output stream as described above. Also upon loading, the instrumentation component 214 of FIG. 2 is operated with the Aspect component 216 to create interceptor hooks for the output stream. To achieve this, Instrumentation and Aspect components 216 manipulate the code that generates the output stream and creates callback hooks that will be recognized by stream interceptor 218, and will cause the interceptor to route the stream content to directive engine 220, as described above. As an example, if a Java class (e.g. Servlet) is compiled originally from a JSP, the callback hooks are created for the following code which generates an output stream in a class compiled from JSP:

Javax.servlet.jsp.JspWriter.print(*)
Javax.servlet.jsp.JspWriter.println(*)
Javax.servlet.jsp.JspWriter.write(*)

Instrumentation step 406 also causes an SMAP for the originating source to be cached and made available for retrieval, as indicated by step 410.

Referring further to FIG. 4, decision step 412 is provided to query whether an output stream has been intercepted. If the result of the query is positive, the content of the intercepted stream is combined with previously cached content, if any, at step 414. The result is then moved to decision step 416.

At step 416, it is determined whether or not a debug directive can be applied to intercepted content, or to combined content. As described above, Lexeme rules 226 may prohibit insertion of a debug directive into any of the content of a particular output stream. In this case, the stream content is routed to decision step 418, which determines whether or not the content needs to be placed in a cache. If the decision is positive, the content is cached at step 420. Then, this content is combined with the content of the very next intercepted output stream, and this combination is routed to step 416.

Even if the lexeme rules prohibited use of a debug directive with previous content at step 416, the rules may allow a debug directive to be applied to the combined content. If so, the combined content is moved to step 424. If a debug directive cannot be applied to the combined content, such content is moved to decision step 418, and may be cached at step 420. Generally, content that cannot receive a debug directive will be combined with the content of each succeeding intercepted output stream, until application of a debug directive is allowed. If step 418 determines that particular content received thereby does not need to be cached, the method of FIG. 4 proceeds to step 422, and normal processing is continued.

At step 424, the source and line number, which is going to be provided in the end clause of the most recent debug directive, is retrieved. The source and line number retrieved is the one in target class; therefore, further examination is needed to determine weather a original source exists or not. Then, step 426 determines whether a source and line number is contained in the SMAP, as described above in connection with FIG. 2. If the result of the query at step 426 is positive, the original source and line information, which corresponds to the information retrieved at step 424, is retrieved from the SMAP cache at step 428. This information is then used to create a debug directive at step 430, for the content needing the debug directive as decided at step 416. The debug directive is inserted into the output stream of such content at step 432, and normal processing is resumed.

If step 426 provides a negative decision, the source and line number retrieved at step 424 is used at step 430 to create the debug directive.

When an HTML document is dynamically generated in server side and outputted to the client side, so that many discrete elements or portions of the document contain debug directives as described above, the document can be processed by a validation tool to furnish information pertaining to errors. A validation tool normally processes a document in a form of Document Object Model (DOM) tree which is a computer-readable format of a document. For example, content contained in streams that are input to the document from the server side, in order to provide respective lines of document content, can be used to provide nodes for a DOM tree. Some of the nodes can comprise debug directives, and other nodes can be validation targets. A validation target is a node in a DOM tree, or a unit of content or markup in a document that must be examined, to ensure that it is in compliance with prespecified rules associated with security, quality, accessibility or other issues. Each finding of noncompliance would be a reportable error. For instance, an img node (<img> tag) in an HTML document is a validation target because it must have an associated alternative text according to an accessibility compliance rule.

Figure 5:
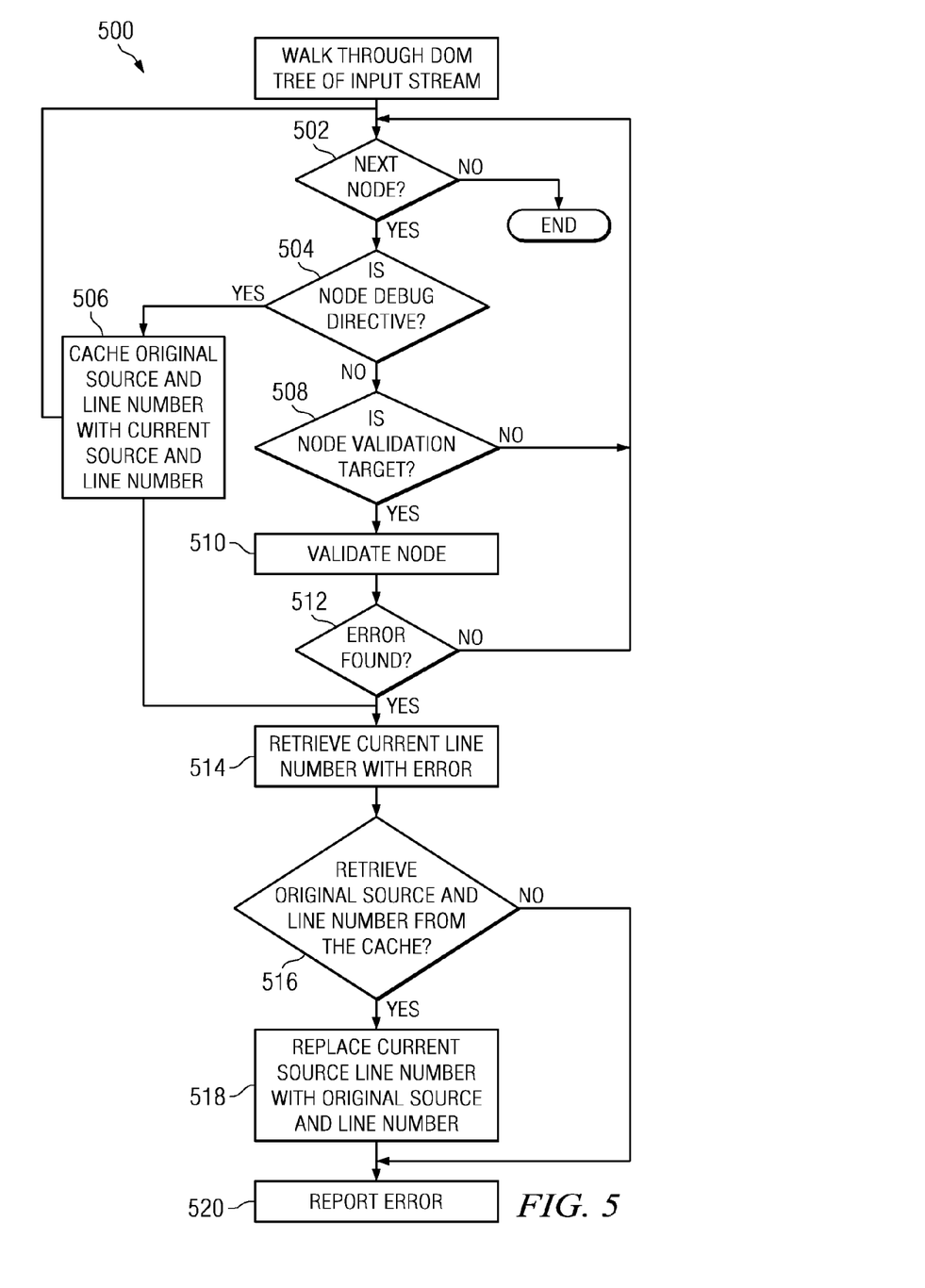
FIG. 5 is a flowchart showing steps in operating a validation tool associated with embodiments of the invention.

Referring to FIG. 5, there is shown a flowchart depicting steps of a method for operating a validation tool or the like on a DOM tree having nodes as defined above. At decision step 502 the next node, if there are any, is selected and the method moves to decision step 504. Step 504 queries whether the node is a debug directive. If the query is affirmative, at step 506 the document line number associated with the debug directive is placed in a cache, together with the original source and line number that are included with the debug directive, as described above.

If the node is determined not to be a debug directive at step 504, it is decided at step 508 whether the node is a validation target. If not, the method returns to step 502 to consider the next node. However, if the node is a validation target, it is validated at step 510. Then, at step 512 it is decided whether or not the validation process found a compliance error in the node. If not, the method again returns to step 502. Otherwise, the document line number of the validated node, in which an error is found, is retrieved at step 514.

At step 516, it is queried whether the document line number retrieved at step 514 has a corresponding original source and line number that was placed in the cache at step 506. If this query is affirmative, the document line number associated with the error is replaced by such original source and line number, at step 518. This information is then entered into an error report at step 520.

At step 516, if a corresponding original source and line number are not found in the cache, the document line number is used in the error report. If step 502 determines that there are no more nodes to process, the method of FIG. 5 ends.

Figure 6:
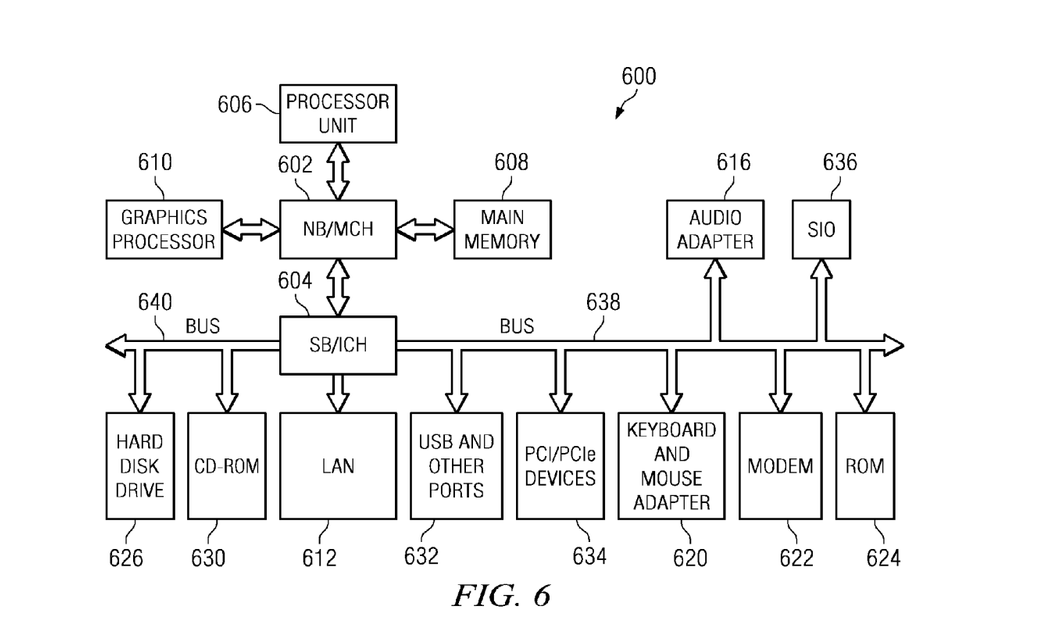
FIG. 6 is a block diagram depicting a computer or data processing system that may be used in implementing embodiments of the invention.

Referring to FIG. 6, there is shown a data processing system 600 that may be used in implementing embodiments of the invention. Data processing system 600 is an example of a computer, which may be used for any or each of the servers 104 and 106 and clients 108-112 of FIG. 1, in which computer usable code or instructions implementing the processes for embodiments of the present invention may be located.

Data processing system 600 employs a hub architecture including north bridge and memory controller hub (MCH) 602 and south bridge and input/output (I/O) controller hub (ICH) 604. Processing unit 606, main memory 608, and graphics processor 610 are connected to north bridge and memory controller hub 602. Graphics processor 610 may be connected to north bridge and memory controller hub 602 through an accelerated graphics port (AGP).

In data processing system 600, local area network (LAN) adapter 612 connects to south bridge and I/O controller hub 604. Audio adapter 616, keyboard and mouse adapter 620, modem 622, read only memory (ROM) 624, hard disk drive (HDD) 626, CD-ROM drive 630, universal serial bus (USB) ports and other communications ports 632, and PCI/PCIe devices 634 connect to south bridge and I/O controller hub 604 through bus 638 and bus 640. PCI/PCIe devices may include, for example, Ethernet adapters, add-in cards and PC cards for notebook computers. PCI uses a card bus controller, while PCIe does not. ROM 624 may be, for example, a flash binary input/output system (BIOS).

Hard disk drive 626 and CD-ROM drive 630 connect to south bridge and I/O controller hub 604 through bus 640. Hard disk drive 626 and CD-ROM drive 630 may use, for example, an integrated drive electronics (IDE) or serial advanced technology attachment (SATA) interface. Super I/O (SIO) device 636 may be connected to south bridge and I/O controller hub 604.

An operating system runs on processing unit 606 and coordinates and provides control of various components within data processing system 600 in FIG. 6. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 600 (Java is a trademark of Sun Microsystems, Inc. in the United States, other countries, or both).

As a server, data processing system 600 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as hard disk drive 626, and may be loaded into main memory 608 for execution by processing unit 606. The processes for embodiments of the present invention are performed by processing unit 606 using computer usable program code, which may be located in a memory such as, for example, main memory 608, read only memory 624, or in one or more peripheral devices 626 and 630.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a data transfer network having a server side and a client side, a method comprising the steps of:
    sending content from the server side to the client side in successive output streams to dynamically create a document on the client side, wherein the content for different output streams is provided, respectively, from different ones of a plurality of originating sources that are located on the server side;
    intercepting a given output stream that is intended for transmission from said server side and reception at said client side;
    determining whether or not a debug directive can be inserted into said intercepted output stream, wherein said determination is made in conformance with pre-specified lexeme rules associated with said intercepted output stream, and the lexeme rules determine whether a debug directive can be inserted into any of the content of said intercepted output stream;
    responsive to a determination that a debug directive can be inserted into said intercepted output stream, creating a debug directive that contains information identifying the originating source on said server side which provided the content for said intercepted output stream; and
    inserting said created debug directive into said intercepted output stream at a selected insertion position, prior to reception at said client side.

2. The method of claim 1, further comprising:
    creating a portion of said document from the content of a particular output stream that has received one of said debug directives;
    detecting an error in said document portion; and
    using information contained in the debug directive of the particular stream to determine the originating source that provided the content used to create the document portion.

3. The method of claim 1, wherein:
    said identifying information contained in said debug directive identifies said originating source, and further provides a line number of said source that indicates the portion of said source used to derive the content of said intercepted output stream.

4. The method of claim 1, further comprising:
    responsive to a determination that a debug directive cannot be inserted into said intercepted stream, placing said intercepted stream into a cache, and then combining said intercepted stream with the contents of one or more subsequently intercepted streams.

5. The method of claim 4, further comprising:
    determining whether or not a debug directive can be inserted into the combined contents of said intercepted stream and said one or more subsequently intercepted streams.

6. The method of claim 1, wherein:
    a specified validation tool is operated on said client side to acquire information from one of said debug directives, in response to detecting an error in said created document, and is further operated to use said acquired information to identify an originating source on said server side that caused said detected error.

7. The method of claim 1, wherein:
    at least one of said originating sources is a script source that is transformed to a class source to provide content for said intercepted output stream, and said step of creating a debug directive includes identifying said script source from information contained in said intercepted stream that identifies said class source.

8. The method of claim 7, wherein:
    a source map of line numbers between said script source and said class source is used to determine the originating source information for said debug directive.

9. The method of claim 1, wherein:
    said created document comprises a human readable document.

10. The method of claim 1, wherein:
    said originating sources include a java class source and a java script source, and
    wherein the lexeme rule determines a minimum unit of content for a given output stream, below which a debug directive cannot be inserted, wherein the lexeme rule is predetermined based on a content type in the given output stream, and wherein the lexeme rule is content specific.

11. In a data transfer network having a server side and a client side, a computer program product executable in a computer readable storage device comprising:
    instructions for sending content from the server side to the client side in successive output streams to dynamically create a document on the client side, wherein the content for different output streams is provided, respectively, from different ones of a plurality of originating sources that are located on the server side;

instructions for intercepting a given output stream that is intended for transmission from said server side and reception at said client side;

instructions for determining whether or not a debug directive can be inserted into said intercepted output stream, wherein said determination is made in conformance with prespecified lexeme rules associated with said intercepted output stream, and the lexeme rules determine whether a debug directive can be inserted into any of the content of said intercepted output stream;

instructions for responsive to a determination that a debug directive can be inserted into said intercepted output stream, for creating a debug directive that contains information identifying the originating source on said server side which provided the content for said intercepted output stream; and instructions for inserting said created debug directive into said intercepted output stream at a selected insertion position, prior to reception at said client side.

12. The computer program product of claim 11, further comprising:

instructions for creating a portion of said document from the content of a particular output stream that has received one of said debug directives;

instructions for detecting an error in said document portion; and instructions for using information contained in the debug directive of the particular stream to determine the originating source that provided the content used to create the document portion.

13. The computer program product of claim 11, wherein:

said identifying information contained in said debug directive identifies said originating source, and further provides a line number of said source that indicates the portion of said source used to derive the content of said intercepted output stream.

14. The computer program product of claim 11, further comprising:

responsive to a determination that a debug directive cannot be inserted into said intercepted stream, said intercepted stream is placed into a cache, and then said intercepted stream is combined with the contents of one or more subsequently intercepted streams.

15. The computer program product of claim 14, further comprising:

instructions for determining whether or not a debug directive can be inserted into the combined contents of said intercepted stream and said one or more subsequently intercepted streams.

16. In a data transfer network having a server side and a client side, an apparatus comprising:

a storage device including a storage medium, wherein the storage device stores computer usable program code; and a processor, wherein the processor executes the computer usable program code, and wherein the computer usable program code comprises:

computer usable code for sending content from the server side to the client side in successive output streams to dynamically create a document on the client side, wherein the content for different output streams is provided, respectively, from different ones of a plurality of originating sources that are located on the server side;

computer usable code for intercepting a given output stream that is intended for transmission from said server side and reception at said client side;

computer usable code for determining whether or not a debug directive can be inserted into said intercepted output stream, wherein said determination is made in conformance with prespecified lexeme rules associated with said intercepted output stream, and the lexeme rules determine whether a debug directive can be inserted into any of the content of said intercepted output stream;

computer usable code, responsive to a determination that a debug directive can be inserted into said intercepted output stream, for creating a debug directive that contains information identifying the originating source on said server side which provided the content for said intercepted output stream; and computer usable code for inserting said created debug directive into said intercepted output stream at a selected insertion position, prior to reception at said client side.

17. The apparatus of claim 16, further comprising:

computer usable code for creating a portion of said document from the content of a particular output stream that has received one of said debug directives;

computer usable code for detecting an error in said document portion; and computer usable code for using information contained in the debug directive of the particular stream to determine the originating source that provided the content used to create the document portion.

18. The apparatus of claim 16, wherein:

said identifying information contained in said debug directive identifies said originating source, and further provides a line number of said source that indicates the portion of said source used to derive the content of said intercepted output stream.

19. The apparatus of claim 16, further comprising:

computer usable code, responsive to a determination that a debug directive cannot be inserted into said intercepted stream, for placing said intercepted stream into a cache, and then combining said intercepted stream with the contents of one or more subsequently intercepted streams.

20. The apparatus of claim 16, wherein:

said apparatus includes a specified validation tool operated on said client side to acquire information from one of said debug directives, in response to detecting an error in said created document, and further operated to use said acquired information to identify an originating source on said server side that caused said detected error.

* * * * *